April 26, 1960     T. W. MILLNS     2,933,941
SCREW AND NUT MECHANISMS
Filed Jan. 27, 1958

Inventor
T. W. Millns
By Glascock Downing Seebold
Attys.

United States Patent Office 2,933,941
Patented Apr. 26, 1960

2,933,941
SCREW AND NUT MECHANISMS

Terence William Millns, Acton, London, England, assignor to Rotax Limited, London, England Application January 27, 1958, Serial No. 711,205

Claims priority, application Great Britain January 28, 1957

1 Claim. (Cl. 74—441)

The invention relates to screw and nut mechanisms of the kind in which the screw and nut are helically grooved and are interengaged by a train of balls occupying the grooves.

For some purposes it is important to avoid back-lash between the screw and nut, and the object of the present invention is to enable this requirement to be met in a simple and convenient manner.

A mechanism of the said type in accordance with the invention includes a nut made from two parts one or each of which is angularly adjustable relatively to the other.

Figure 1:
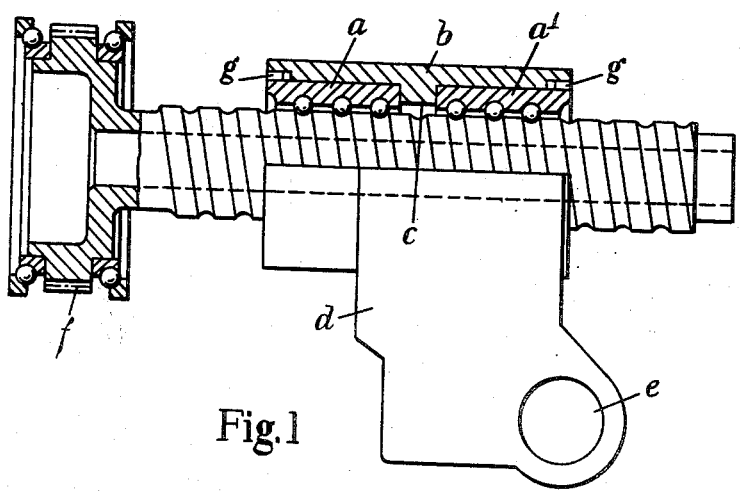

In one example, as applied to a screw jack, and as illustrated by Figure 1 of the accompanying drawings, the nut consists of a pair of separate and similar cylindrical parts $a$, $a1$. These parts are contained in the opposite ends of a sleeve $b$, the latter having at its centre an annular shoulder $c$ against the opposite sides of which the adjacent ends of the nut parts can abut. In this example, the sleeve $b$ is incorporated with a coupling $d$ adapted for pivotal attachment at $e$ to a part to be actuated by the screw. Rotation of the screw is effected by power applied to it through a gear wheel $f$ on one end of the screw.

For interlocking the nut parts and sleeve, each nut part has formed on its outer end a castellated ring $g$ and in each outer end of the sleeve is formed a complementary castellated socket. The pitch of the teeth or splines of the castellations at the interengageable ends of the sleeve and nut parts is such as will enable a fine axial adjustment to be effected between the nut parts. When such adjustment is required, the screw is first withdrawn from the nut parts, whereupon either of the nut parts is then retracted for disengaging its castellated part from the sleeve, and after having received an appropriate angular movement it is slid into re-engagement with the sleeve.

Any convenient provision is made in the sleeve for insertion and removal of the two trains of balls and for enabling the balls to circulate in the associated helical grooves of the screw and nut parts. Thus, the nut parts may be provided with transfer passages as described in the specification of Patent No. 2,618,166 (J. G. Douglas), dated November 18, 1952. Moreover, the balls may be loaded in the nut grooves and retained therein by grease when the screw is withdrawn from the nut parts.

Figure 2:
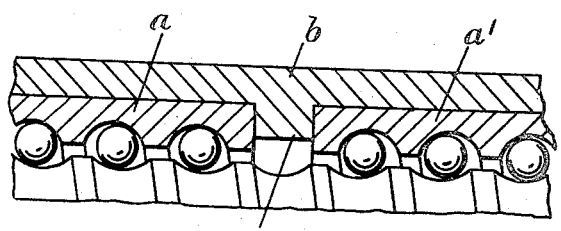

To avoid undesired disengagement of either nut part from the sleeve by the normal action of the screw the grooves in the screw and nut parts are shaped as shown in the fragmentary drawing in Figure 2. It will be noticed that width of these grooves is made greater than the diameter of the balls. The effect of this is that when the screw is rotated in one direction the load is taken wholly by one of the nut parts and this nut part is forced by the axial thrust of the screw into tight contact with one side of the shoulder $c$. Meanwhile the effect of the screw on the balls of the other nut part is to move them in their grooves to a central and idle position in which they exert no thrust on the associated nut part such as would otherwise move the nut part out of the sleeve. When the screw is rotated in the opposite direction the direction of the axial thrust is reversed and the load is then taken in like manner by the other nut part.

When it is required to effect relative angular adjustment of the nut parts to compensate the effect of wear, and thereby take up back lash, the screw is first withdrawn from the nut parts, whereupon either or each nut part is withdrawn from the sleeve sufficiently to disengage the corresponding castellations, and is then moved angularly about its axis relative to the sleeve preparatory to being re-inserted into the sleeve for causing re-engagement of the corresponding castellations.

This invention is applicable in like manner to other mechanisms of the kind specified.

Having thus described my invention what I claim as new and desire to secure by Letters Patent is:

A screw and nut mechanism comprising in combination a helically grooved screw, a sleeve surrounding said screw and provided internally with a centrally disposed annular shoulder, a pair of similar helically grooved cylindrical nut parts contained in opposite ends of said sleeve so that the inner ends of said nut parts can abut against the corresponding sides of said annular shoulder, trains of balls engaging the grooves in, and thereby serving to effect interengagement of, said screw and nut parts, the opposite ends of said sleeve and the outer ends of said nut parts being formed with complementary and interengaging castellations which, to compensate the effect of wear, are disengageable by retractive movements of said nut parts from the ends of said sleeve, and thereafter re-interengageable with said nut parts in different angular positions relative to each other and said sleeve, and the width of the helical grooves in said screw and nut parts being greater than the diameter of said balls to avoid undesirable disengagement of either of said nut parts from said sleeve when the other of said nut parts is forced by axial thrust of said screw into tight contact with the corresponding side of said annular shoulder.

References Cited in the file of this patent
UNITED STATES PATENTS

| 525,771 | Parks | Sept. 11, 1894 |
| 525,780 | Boynton | Sept. 11, 1894 |
| 1,383,239 | Roland | June 28, 1921 |
| 1,500,270 | Rodel | July 8, 1924 |
| 1,645,276 | Burns | Oct. 11, 1927 |
| 2,119,705 | De Vlieg | June 7, 1938 |
| 2,195,799 | Parsons | Apr. 2, 1940 |
| 2,311,677 | McKinney | Feb. 23, 1943 |
| 2,385,194 | Carroll | Sept. 18, 1945 |
| 2,447,439 | Thompson | Aug. 17, 1948 |
| 2,679,168 | Rokas | May 25, 1954 |

FOREIGN PATENTS

| 341,834 | Germany | Oct. 8, 1921 |
| 1,062,878 | France | Apr. 28, 1954 |

OTHER REFERENCES

Publication: Design News, Nov. 1, 1956, pages 54–55.